United States Patent
Naka

(10) Patent No.: US 10,096,100 B2
(45) Date of Patent: Oct. 9, 2018

(54) INSPECTION DEVICE, INSPECTION METHOD, AND IMAGE PROCESSING PROGRAM

(71) Applicant: Toshiba Memory Corporation, Tokyo (JP)

(72) Inventor: Masato Naka, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 59 days.

(21) Appl. No.: 15/046,841

(22) Filed: Feb. 18, 2016

(65) Prior Publication Data
US 2017/0069087 A1    Mar. 9, 2017

(30) Foreign Application Priority Data

Sep. 3, 2015   (JP) .................................. 2015-174181

(51) Int. Cl.
*G06K 9/00* (2006.01)
*G06T 7/00* (2017.01)
*G06T 3/40* (2006.01)

(52) U.S. Cl.
CPC .......... *G06T 7/0002* (2013.01); *G06T 3/4007* (2013.01); *G06T 7/001* (2013.01); *G06T 2207/10061* (2013.01); *G06T 2207/30148* (2013.01)

(58) Field of Classification Search
CPC ................... G06T 7/002; G06T 7/0004; G06T 2207/30148; G06T 2207/10061
See application file for complete search history.

(56) References Cited

U.S. PATENT DOCUMENTS

| | | | | |
|---|---|---|---|---|
| 6,583,413 | B1* | 6/2003 | Shinada | G01N 23/225 250/306 |
| 9,734,558 | B2* | 8/2017 | Porikli | G06T 3/4076 |
| 9,824,853 | B2* | 11/2017 | Kobayashi | H01J 37/265 |
| 2002/0117967 | A1* | 8/2002 | Gerlach | B82Y 10/00 315/13.1 |
| 2004/0264764 | A1* | 12/2004 | Kochi | G01B 15/04 382/154 |

(Continued)

FOREIGN PATENT DOCUMENTS

| JP | 2004-279239 A | 10/2004 |
|---|---|---|
| JP | 2009-139166 A | 6/2009 |

(Continued)

*Primary Examiner* — Aaron W Carter
(74) *Attorney, Agent, or Firm* — Finnegan, Henderson, Farabow, Garrett & Dunner, L.L.P.

(57) ABSTRACT

An inspection device according to an embodiment includes a microscope, a storage section, an image processing section and an inspection section. The microscope is configured to obtain a primary image by capturing an inspection target. The storage section stores a function defining a relationship between a low-resolution image and a high-resolution image of a calibration sample. The high-resolution image has smaller pixel size than the low-resolution image. The image processing section is configured to generate a secondary image based on the primary image by using the function. The secondary image has smaller pixel size than the primary image. The inspection section is configured to inspect the inspection target using the secondary image.

17 Claims, 10 Drawing Sheets

(56) References Cited

U.S. PATENT DOCUMENTS

| | | | | |
|---|---|---|---|---|
| 2006/0108525 | A1* | 5/2006 | Nakagaki | G03F 7/7065 250/310 |
| 2006/0251318 | A1* | 11/2006 | Gunji | G01N 23/203 382/147 |
| 2007/0158588 | A1* | 7/2007 | Zhou | H01J 37/073 250/492.2 |
| 2008/0099675 | A1* | 5/2008 | Hiroi | G06T 7/001 250/307 |
| 2009/0084953 | A1* | 4/2009 | Harada | G01N 23/225 250/307 |
| 2009/0208091 | A1* | 8/2009 | Hayakawa | G01N 21/956 382/149 |
| 2010/0053694 | A1* | 3/2010 | Tsuchida | G06T 3/4053 358/447 |
| 2011/0026811 | A1 | 2/2011 | Kameyama | |
| 2011/0129141 | A1* | 6/2011 | Hiroi | G01N 21/9501 382/149 |
| 2011/0200270 | A1* | 8/2011 | Kameyama | G06T 1/00 382/260 |
| 2012/0045115 | A1* | 2/2012 | Dong | G01N 21/95607 382/149 |
| 2012/0275718 | A1* | 11/2012 | Takamori | G06K 9/36 382/238 |
| 2012/0327212 | A1 | 12/2012 | Kitahashi et al. | |
| 2013/0034313 | A1* | 2/2013 | Lin | G06T 3/4053 382/299 |
| 2013/0070078 | A1* | 3/2013 | Takagi | G06T 7/001 348/80 |
| 2013/0082177 | A1* | 4/2013 | Hiroi | G01N 23/2251 250/310 |
| 2014/0219546 | A1* | 8/2014 | Minekawa | G06T 7/0004 382/149 |
| 2014/0219547 | A1* | 8/2014 | Tuzel | G06T 3/4053 382/154 |
| 2014/0349485 | A1* | 11/2014 | Umekawa | H01L 31/02363 438/694 |
| 2015/0029324 | A1 | 1/2015 | Tanabe | |
| 2015/0269708 | A1* | 9/2015 | Porikli | G06T 3/4007 382/160 |
| 2016/0180502 | A1* | 6/2016 | Salvador Marcos | G06T 3/4053 382/155 |
| 2017/0069087 | A1* | 3/2017 | Naka | G06T 7/0018 |
| 2017/0206632 | A1* | 7/2017 | Milanfar | G06K 9/4604 |
| 2017/0243084 | A1* | 8/2017 | Soatto | G06K 9/6267 |

FOREIGN PATENT DOCUMENTS

| | | |
|---|---|---|
| JP | 2011-34344 A | 2/2011 |
| JP | 2015-129987 A | 7/2015 |

* cited by examiner

INSPECTION DEVICE, INSPECTION METHOD, AND IMAGE PROCESSING PROGRAM

CROSS-REFERENCE TO RELATED APPLICATIONS

This application is based upon and claims the benefit of priority from Japanese Patent Application No. 2015-174181, filed on Sep. 3, 2015; the entire contents of which are incorporated herein by reference.

FIELD

Embodiments relate to an inspection device, an inspection method and an image processing program.

BACKGROUND

With the miniaturization of semiconductor devices, the sensitivity and throughput of defect inspection in the manufacturing line of semiconductor devices have been increasingly demanding year by year. Conventionally, such defect inspection uses light such as DUV light and ArF light, or an electron beam (EB). Inspection using light has high throughput, and is widely applied to e.g. inspection of a mask used in the lithography process and inspection of a wafer after light exposure. Such inspection based on light can detect a defect causing electrical failure of a semiconductor device in the conventional pattern size. However, in a fine pattern with a half-pitch of approximately 10 nm, it is difficult to clearly resolve the pattern. This makes it difficult to detect defects.

On the other hand, inspection using an electron beam can resolve such a fine pattern. Thus, inspection using an electron beam has good sensitivity and is promising as a technique for inspecting a pattern with a half-pitch of approximately 10 nm. However, inspection using an electron beam has a problem of low throughput. The throughput can be improved by lowering the inspection magnification. However, this coarsens the image and decreases the sensitivity. On the other hand, increasing the inspection magnification improves the sensitivity, but lowers the throughput.

DETAILED DESCRIPTION

An inspection device according to an embodiment includes a microscope, a storage section, an image processing section and an inspection section. The microscope is configured to obtain a primary image by capturing an inspection target. The storage section stores a function defining a relationship between a low-resolution image and a high-resolution image of a calibration sample. The high-resolution image has smaller pixel size than the low-resolution image. The image processing section is configured to generate a secondary image based on the primary image by using the function. The secondary image has smaller pixel size than the primary image. The inspection section is configured to inspect the inspection target using the secondary image.

An inspection method according to an embodiment includes obtaining a primary image of an inspection target. The method includes generating a secondary image based on the primary image by using a function. The function is generated based on a low-resolution image and a high-resolution image of a calibration sample. The secondary image has smaller pixel size than the primary image. The high-resolution image has smaller pixel size than the low-resolution image. The method includes inspecting the inspection target using the secondary image.

An image processing program according to an embodiment causes a computer to execute a procedure. The procedure is configured to generate a secondary image based on a primary image of an inspection target by using a function. The function is generated based on a low-resolution image and a high-resolution image of a calibration sample. The secondary image has smaller pixel size than the primary image. The high-resolution image has smaller pixel size than the low-resolution image.

First Embodiment

First, a first embodiment is described.

First, an inspection method according to the embodiment is briefly described.

Figure 1:
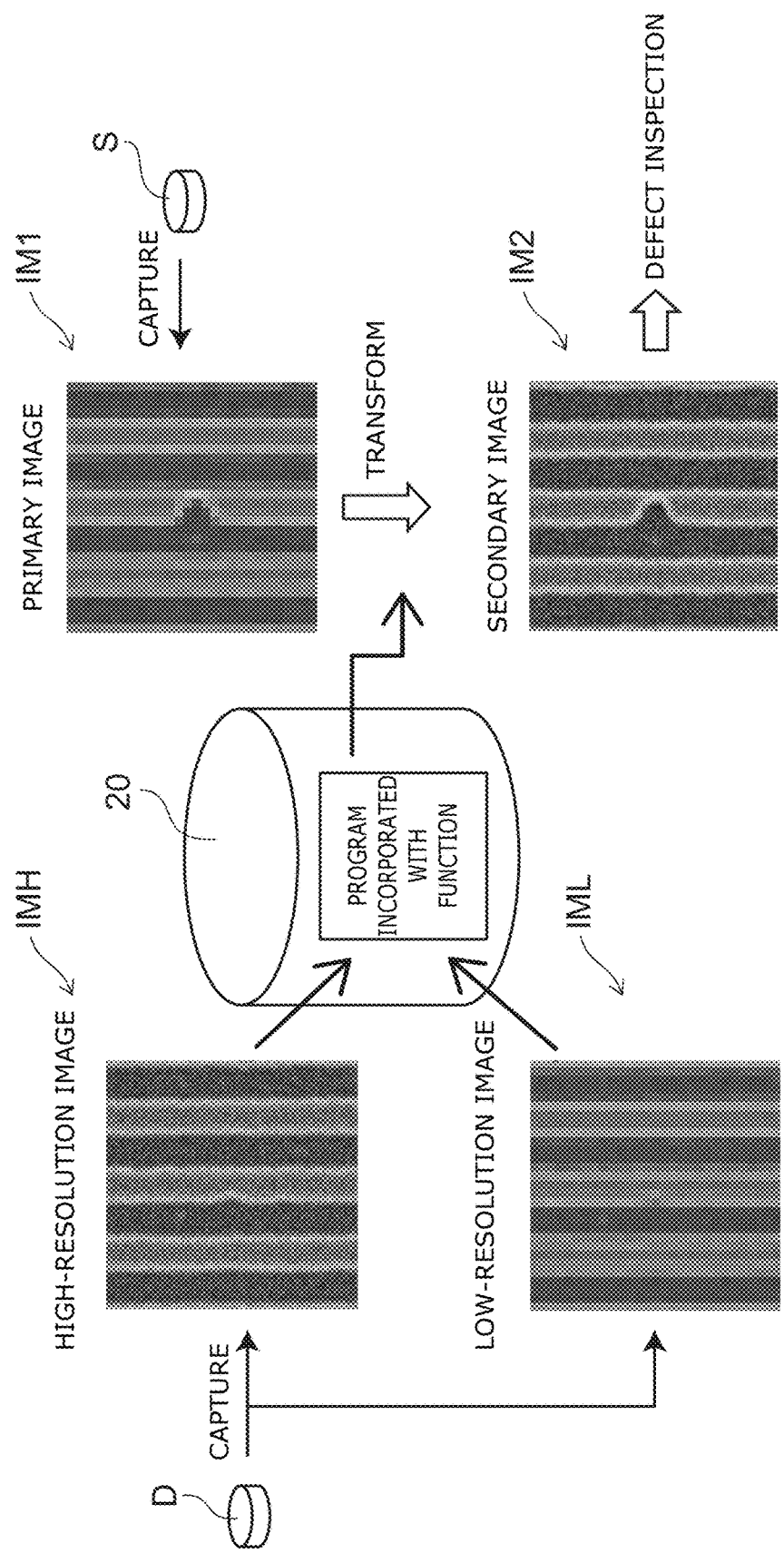
FIG. 1 schematically shows an inspection method according to a first embodiment.

FIG. 1 schematically shows the inspection method according to the embodiment.

The inspection device according to the embodiment is e.g. an electron beam defect inspection device for evaluating the presence or absence of defects in an inspection target. The inspection target of the embodiment is e.g. a lithography mask, a nanoimprint template, or a semiconductor wafer with an integrated circuit formed thereon.

As shown in FIG. 1, in the embodiment, a calibration sample D of the same kind as the inspection target S is prepared in advance. For instance, the inspection target S is a semiconductor wafer with an integrated circuit of a certain pattern formed thereon. In this case, the calibration sample D is also a semiconductor wafer with an integrated circuit of a similar pattern formed thereon. The calibration sample D may be the inspection target S itself. Then, the same portion of the calibration sample D is observed with an electron microscope to obtain a low-resolution image IML and a high-resolution image IMH. At this time, a plurality of portions of the calibration sample D or a plurality of calibration samples D are captured to obtain a plurality of pairs of a low-resolution image IML and a high-resolution image IMH.

Then, a function for generating the high-resolution image from the low-resolution image is generated. For instance, the function is an interpolation function for estimating a pixel value at an arbitrary point between adjacent pixels in the low-resolution image. The pixel value of each pixel in the low-resolution image IML and the high-resolution image IMH of the aforementioned calibration sample D is substituted into a prototype of an interpolation function including a coefficient with an unknown value. Thus, the value of the coefficient is determined by statistical technique to complete the interpolation function. Then, an inspection program incorporated with the completed interpolation function is stored in a storage section 20.

Then, a primary image IM1 of the inspection target S is obtained by the electron microscope. The inspection target S and the calibration sample D are observed with the same electron microscope. The pixel size or resolution of the primary image IM1 is made equal to the pixel size of the low-resolution image IML. Then, the aforementioned interpolation function is used to generate a secondary image IM2 from the primary image IM1. The pixel size of the secondary image IM2 is made equal to the pixel size of the high-resolution image IMH. Then, the secondary image IM2 is used to inspect the inspection target S.

Thus, according to the embodiment, a primary image having low resolution can be obtained in a short time. The primary image is used to generate a secondary image having high resolution. The secondary image is used to inspect the presence or absence of defects. Thus, inspection can be performed with high sensitivity. This provides compatibility between high sensitivity and high throughput. Furthermore, a function is completed using a calibration sample D of the same kind as the inspection target S. Thus, a function corresponding to the kind of the inspection target S can be obtained. This can enhance the accuracy of the secondary image and enhance the accuracy of inspection.

Next, the configuration and operation of the embodiment are described in more detail.

Figure 2:
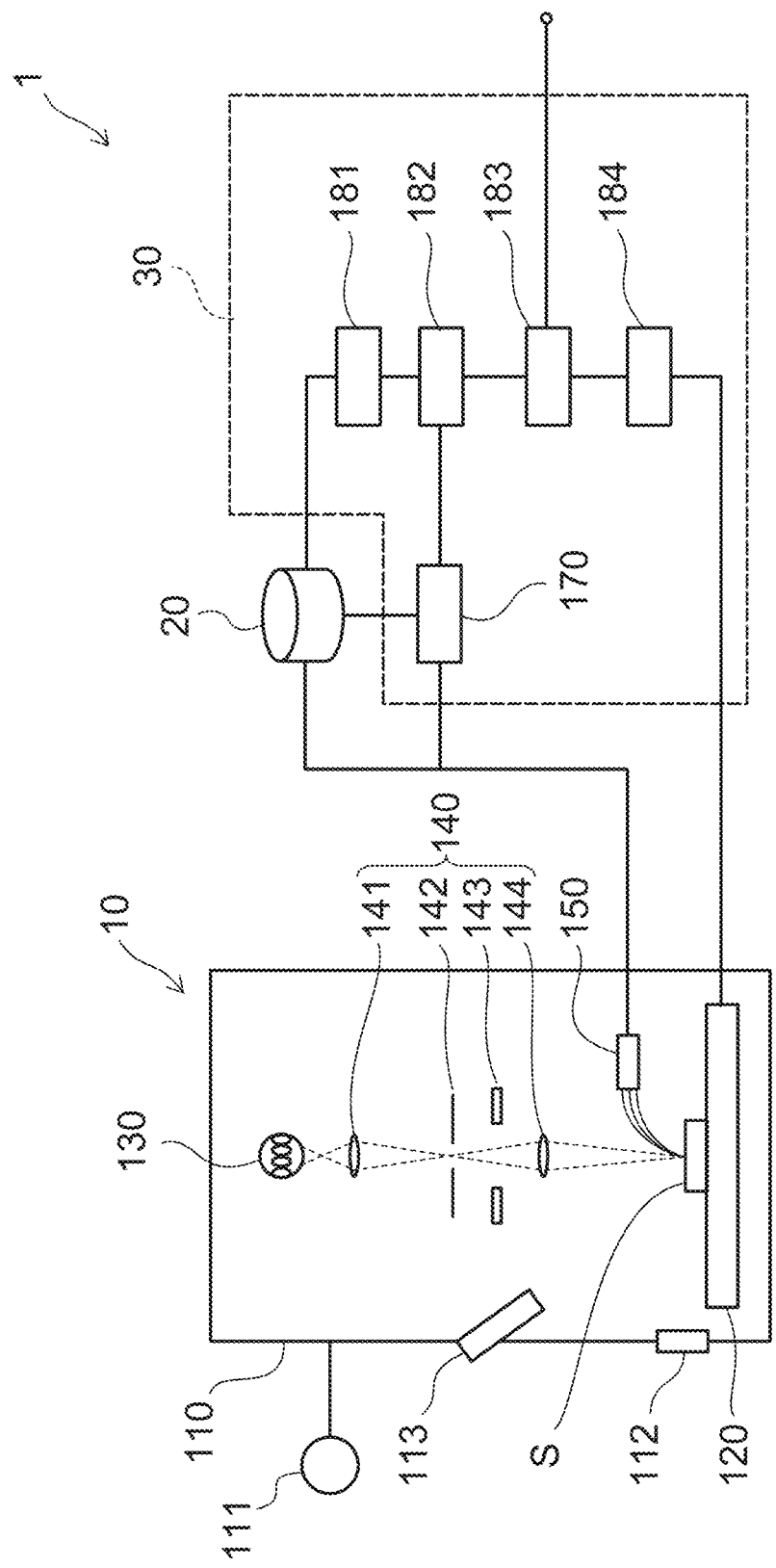
FIG. 2 is a block diagram showing an inspection device according to the first embodiment.

FIG. 2 is a block diagram showing the inspection device according to the embodiment.

As shown in FIG. 2, the inspection device 1 according to the embodiment includes a scanning electron microscope 10, a storage section 20, and a control section 30.

The electron microscope 10 includes a reduced-pressure chamber 110, a vacuum pump 111, and a load port 112. The vacuum pump 111 is connected to the reduced-pressure chamber 110. The vacuum pump 111 evacuates the reduced-pressure chamber 110. Thus, the inside of the reduced-pressure chamber 110 can be kept at a lower air pressure than the ambient. The load port 112 is a mechanism for loading/unloading a sample in the reduced-pressure chamber 110. Furthermore, the electron microscope 10 is provided with an alignment optical microscope 113. The reduced-pressure chamber 110 contains an X-Y stage 120, an electron beam source 130, an electron beam optical system 140, and a detection section 150. The X-Y stage 120 holds an inspection target S and controls its position. The electron beam source 130 is of the point irradiation type and emits an electron beam. The electron beam optical system 140 focuses the electron beam emitted from the electron beam source 130 and guides the electron beam to the inspection target S. The detection section 150 detects the electron beam obtained from the inspection target S to obtain a primary image.

The inspection target S is mounted on the upper surface of the X-Y stage 120. The X-Y stage 120 is provided with a driving section (not shown). The driving section can translate the X-Y stage 120 in two directions orthogonal to the optical axis of the electron beam incident on the inspection target S and orthogonal to each other. The driving section can rotate the X-Y stage 120 about the optical axis.

In the electron beam source 130, for instance, a filament made of e.g. lanthanum hexaboride ($LaB_6$) is heated to high temperature. A positive high voltage is applied to a metal plate opposed to the filament. Thus, an electron beam is emitted. The current amount of the electron beam can be adjusted by placing an electrode between the filament and the metal plate and applying a negative voltage to this electrode.

The electron beam optical system 140 includes e.g. an electron lens 141 for converging the electron beam, an aperture 142 for removing the aberration component, a scanning coil 143 for scanning the electron beam, and an electron lens 141 for converging the electron beam again. The electron beam optical system 140 may further include e.g. an aberration corrector for correcting the aberration. In the electron microscope 10, the resolution of the inspection target S is determined by the beam diameter of the electron beam narrowed by the electron beam optical system 140. The magnification is determined by the size of the region in which the scanning coil 143 scans the electron beam.

The detection section 150 is placed at a position on the electron beam optical system 140 side of the X-Y stage 120 in the reduced-pressure chamber 110. The detection section 150 amplifies the electron beam emitted from the inspection target S by e.g. a photoelectron multiplier. The detection section 150 obtains a primary image by modulating the luminance of the electron beam in accordance with the difference in the signal amount.

The storage section 20 stores an image processing program incorporated with a function for transforming a primary image having large pixel size and low resolution to a secondary image having small pixel size and high resolution. The function incorporated in the image processing program is a function defining the relationship between the low-resolution image and the high-resolution image and includes one or more coefficients. The value of the coefficient depends on the kind of the inspection target S. The storage section 20 also stores the primary image obtained by the detection section 150 and a reference image inputted from the detection section 150 or outside. Furthermore, the storage section 20 also stores information such as the design data of the measurement target S, alignment information, calibration information, inspection region, and inspection mode. Furthermore, the storage section 20 also stores defect position information inputted from the controller 183 described later.

The control section 30 includes an image processing section 170. The image processing section 170 reads a program from the storage section 20 and executes the program to transform the primary image obtained by the detection section 150. Thus, the image processing section 170 generates a secondary image having higher resolution than the primary image. Furthermore, as necessary, the image processing section 170 performs processing such as noise removal on the primary image and the secondary image. Alternatively, the aforementioned image processing program may be stored in the control section 30, and the coefficients may be stored in the storage section 20. Thus, the control section 30 may read coefficients corresponding to the kind of the inspection target S from the storage section 20 and execute the image processing program.

Furthermore, the control section 30 includes a reference image generation section 181, an image comparison section 182, a controller 183, and a stage control section 184.

The reference image generation section 181 prepares a reference image for comparison with the secondary image and outputs the reference image to the image comparison section 182. For instance, when the inspection mode is the "Cell to cell" mode, comparison is performed between two different regions in the same unit pattern of the inspection target S. When the inspection mode is the "Die to die" mode, comparison is performed between the regions corresponding to two of a plurality of unit patterns formed in the inspection target S. In these modes, the reference image generation section 181 reads the captured image stored in the storage section 20 and outputs it as a reference image to the image comparison section 182. On the other hand, when the inspection mode is the "Die to database" mode, the captured image of the inspection target S is compared with an artificial image generated based on the design data of the inspection target S. In this mode, the reference image generation section 181 reads the design data of the inspection target S from the storage section 20 and generates a reference image based on this design data. The reference image generation section 181 outputs the reference image to the image comparison section 182.

The image comparison section 182 as an inspection section compares the secondary image inputted from the image processing section 170 with the reference image inputted from the reference image generation section 181. Thus, the image comparison section 182 detects defects in the inspection target S and outputs the result to the controller 183.

The controller 183 generates position information of each detected defect based on the defect information inputted from the image comparison section 182 and the information on the X-Y stage 120 inputted from the stage control section 184. Furthermore, the controller 183 outputs the image and defect position information obtained from the image comparison section 182 to the storage section 20 and stores them in the storage section 20. Furthermore, the controller 183 outputs information of e.g. inspection position, inspection condition, inspection region, and inspection mode held in the storage section 20 to the stage control section 184. Such information does not necessarily need to be held in the storage section 20, but may be inputted externally.

The controller 183 also functions as an external interface. For instance, the controller 183 receives input of various commands and information from the outside of the inspection device 1. The controller 183 outputs information on the detected defects to the outside of the inspection device 1.

The stage control section 184 operates the driving section of the X-Y stage 120 based on the signal inputted from the controller 183 to move the X-Y stage 120. Furthermore, the stage control section 184 outputs position information of the X-Y stage to the controller 183.

The storage section 20 can be configured from e.g. a hard disk drive or a nonvolatile memory such as flash memory. In the control section 30, each portion may be configured from a dedicated hardware. Alternatively, the control section 30 may be entirely configured from one LSI (large scale integrated circuit). For instance, the control section 30 may be configured by installing software in a CPU (central processing unit) of a general-purpose computer.

Next, a method for generating the aforementioned function incorporated in the image processing program is described.

Figure 3:
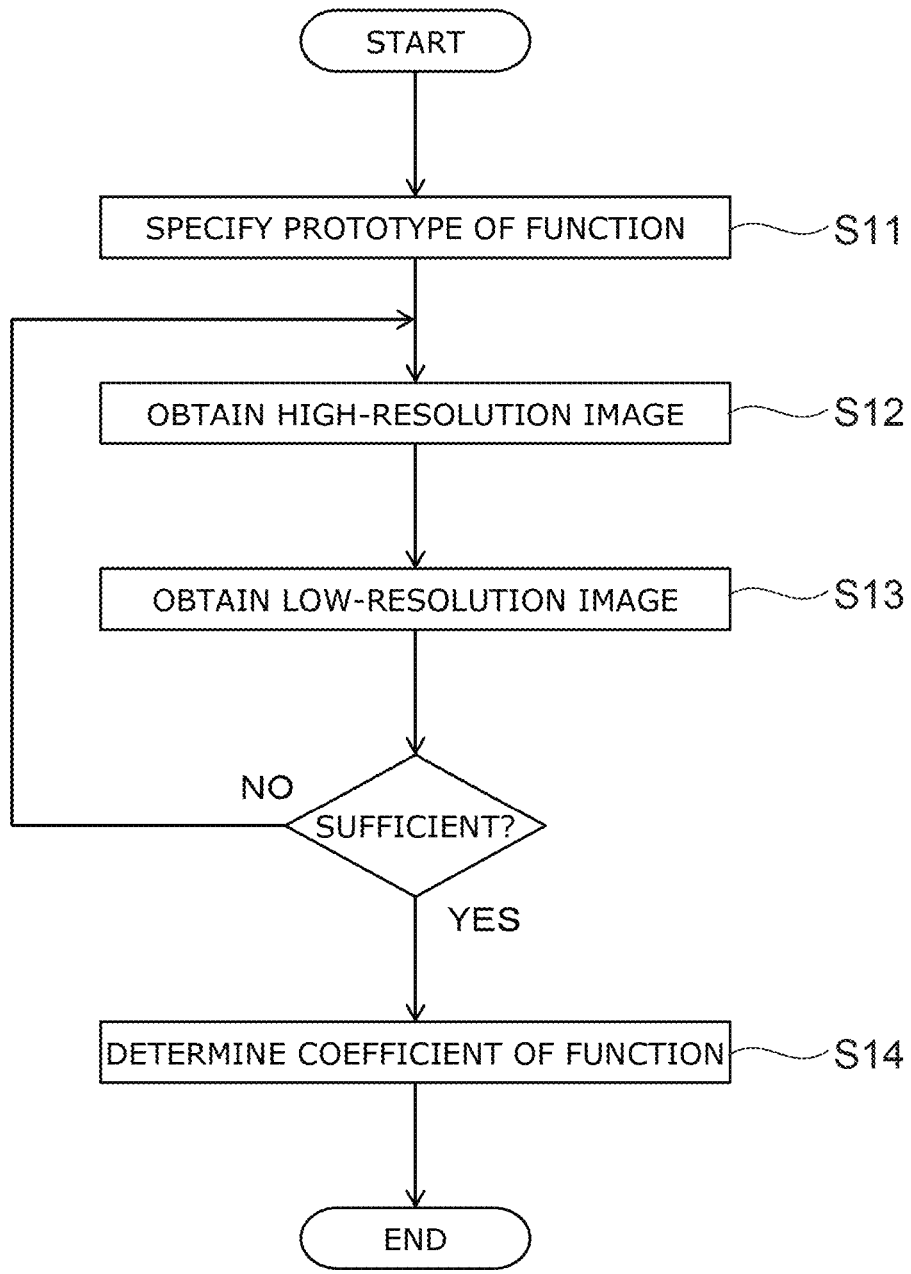
FIG. 3 is a flow chart showing a method for generating a function in the first embodiment.

FIG. 3 is a flow chart showing the method for generating the function in the embodiment.

First, as shown in step S11 of FIG. 3, a prototype of the function is specified. In the embodiment, for instance, the pixel value of a position between the pixels in the primary image is interpolated by calculation to generate a secondary image having smaller pixel size than the primary image. That is, the function is an interpolation function for estimating a pixel value at an arbitrary position between adjacent pixels in a given image. The pixel value is the normalized value of the luminance of the pixel.

Figure 4:
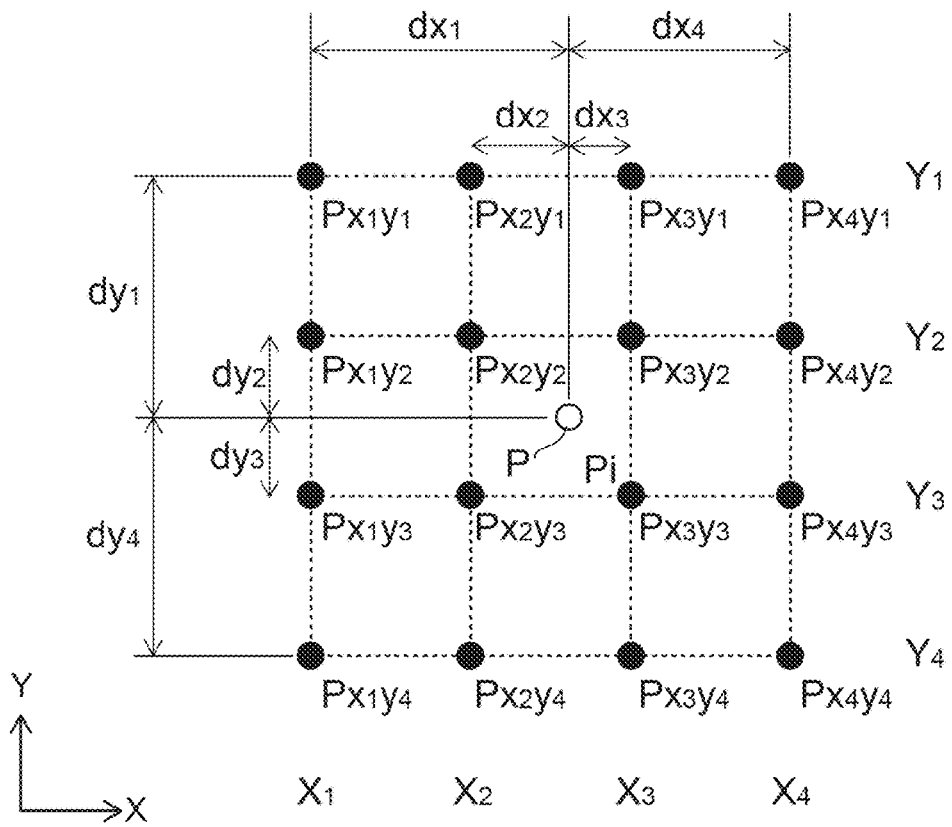
FIG. 4 shows an image including an arbitrary point between pixels and pixels placed in four rows and four columns around the point.

FIG. 4 shows an image including an arbitrary point between the pixels and pixels placed in four rows and four columns around the point.

As shown in FIG. 4, in the target image, the directions in which the pixels are arranged are referred to as X-direction and Y-direction. The pixel value of the pixel at the j-th place in the X-direction and the k-th place in the Y-direction is denoted by $P_{x_j y_k}$. Here, j and k are both integers. Weighting functions are denoted by $w_{x_j}$ and $w_{y_k}$. The pixel value to be estimated, i.e., the pixel value at an arbitrary point P between adjacent pixels in the target image is denoted by $P_i$. In this case, the aforementioned interpolation function can be represented as e.g. a weighted average of the pixel values of the surrounding pixels as given by the following equation (1).

$$P_i = \frac{\sum_{j=1}^{n}\sum_{k=1}^{n}\left(P_{x_j y_k} \times w_{x_j} \times w_{y_k}\right)}{\sum_{j=1}^{n}\sum_{k=1}^{n}\left(w_{x_j} \times w_{y_k}\right)} \quad \text{[Math 1]}$$

The weighting functions $w_{x_j}$ and $w_{y_k}$ are defined as the functions $f(d_{x_j})$ and $f(d_{y_k})$ of the distances $d_{x_j}$ and $d_{y_k}$ between the point P and the surrounding pixel.

$$w_{x_j} = f(d_{x_j}) \quad \text{[Math 2]}$$

$$w_{y_k} = f(d_{y_k}) \quad \text{[Math 3]}$$

Various functions can be specified as the weighting function. Several examples are described below.

Figure 5:
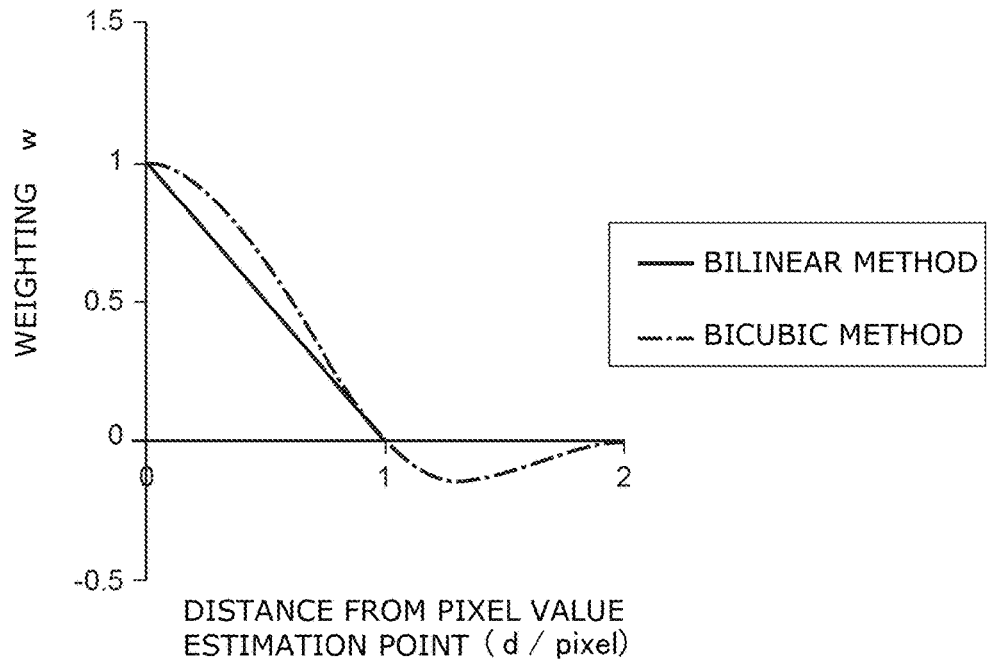
FIG. 5 is a graph showing a distance dependence of a weighting function, the horizontal axis represents a distance from a point at which the pixel value is estimated, the vertical axis represents a value of the weighting function.

FIG. 5 is a graph showing the distance dependence of the weighting function. The horizontal axis represents the distance from the point at which the pixel value is estimated. The vertical axis represents the value of the weighting function.

As shown in FIG. 5 and the following equation (4), in the case of adopting the bilinear interpolation, the weighting functions $w_{x_j}$ and $w_{y_k}$ are linear functions with respect to the distance d. The coefficient α used in the following equation (4) is a coefficient indicating the switching point of the expression. FIG. 5 shows the case of α=1.

$$w(d) = 1 - \frac{|d|}{\alpha}(|d| < \alpha) \quad \text{[Math 4]}$$

$$w(d) = 0(\alpha \leq |d|)$$

On the other hand, as shown in FIG. 5 and the following equation (5), in the case of adopting the bicubic interpolation, the weighting functions $w_{x_j}$ and $w_{y_k}$ are cubic functions with respect to the distance d. The coefficient a used in the following equation (5) is a coefficient affecting the sharpness. In the case where the value of the coefficient a is unknown, in general, the coefficient a is often set to −0.5 or −1.

$$w(d) = \begin{cases} (a+2)|d|^3 - (a+3)|d|^2 + 1 & (|d| \leq 1) \\ a|d|^3 - 5a|d|^2 + 8a|d| - 4a & (1 < |d| \leq 2) \\ 0 & (d > 2) \end{cases} \quad \text{[Math 5]}$$

As shown in the above equations (4) and (5), the expression of the weighting function may be switched in accordance with the distance from the point P. Furthermore, the pixel value may steeply change at e.g. the edge of the pattern. Thus, edge determination may be performed before specifying the weighting function. The weighting function may be switched in accordance with the presence and absence of an edge around the point.

Furthermore, as shown in the following equation (6), the weighting function may adopt a quartic expression with respect to the distance d. In this case, the values of the coefficients m, n, o, p, and q are unknown.

$$w(d) = m|d|^4 + n|d|^3 + o|d|^2 + p|d| + q \quad \text{[Math 6]}$$

Furthermore, as shown in the following equation (7), the weighting function may adopt a sine function. In this case, the coefficient A is unknown.

$$w(d) = A \sin(d\pi) \quad \text{[Math 7]}$$

In step S11, one of e.g. the above equations (4)-(7) is selected. The weighting functions as shown in the above equations (4)-(7) are conventionally used as a standard formula. In the embodiment, the pixel value $P_i$ is known by obtaining the high-resolution image. The pixel value $P_{xjyk}$ is known by obtaining the low-resolution image. Thus, each coefficient of the weighting function w(d) can be determined by e.g. multiple regression analysis.

For instance, in the case of adopting the bilinear interpolation shown in the above equation (4), the optimal value of the distance α switching the function can be determined. In the case of adopting the bicubic interpolation shown in the above equation (5), the optimal value of the coefficient a can be determined. In the case of adopting the quartic function shown in the above equation (6), the optimal value of the coefficients m, n, o, p, and q can be determined. In the case of adopting the sine function shown in the above equation (7), the optimal value of the coefficient A can be determined. The weighting function is not limited to those shown in the above equations (4)-(7), but can be arbitrarily specified.

Next, as shown in step S12 of FIG. 3, a high-resolution image of the calibration sample D is obtained by the electron microscope 10. The calibration sample D is of the same kind as the inspection target S. The calibration sample D may be the inspection target S itself. For instance, a large number of semiconductor wafers with an integrated circuit of the same design formed thereon are successively inspected as an inspection target S. In this case, the first semiconductor wafer may be used as a calibration sample D.

When obtaining a high-resolution image of the calibration sample D, the beam diameter is decreased by making the electron beam narrower than in the case of inspecting the inspection target S. Thus, the image is captured under the condition such that the pixel size is made smaller. The obtained high-resolution image is outputted from the detection section 150 to the storage section 20 and stored in the storage section 20. The high-resolution image may be subjected to image processing such as averaging or Gaussian filter to suppress the decrease of accuracy due to noise. Furthermore, image processing such as Laplacian filter or sharpening filter may be combined for edge emphasis.

Next, as shown in step S13, a low-resolution image having lower resolution than the high-resolution image is obtained for the same region of the calibration sample D in which the high-resolution image is captured. At this time, the beam diameter of the electron beam is increased. Thus, the image is captured under the condition such that the pixel size is made larger. The obtained low-resolution image is outputted from the detection section 150 to the storage section 20 and stored in the storage section 20. Like the high-resolution image, the low-resolution image may also be subjected to image processing such as averaging or Gaussian filter to suppress noise. Furthermore, image processing such as Laplacian filter or sharpening filter may be performed for edge emphasis.

Then, steps S12 and S13 are repeated. Thus, a high-resolution image and a low-resolution image are obtained for a plurality of regions in one calibration sample D or a plurality of calibration samples D and stored in the storage section 20. That is, a plurality of pairs of the high-resolution image and the low-resolution image capturing the same region are stored. After the amount of stored images is made sufficient for statistical processing, the method proceeds to step S14. In the case where a sufficient amount of information is obtained from a pair of images, steps S12 and S13 only need to be performed once for each. Step S13 may be performed before step S12.

In step S14, the coefficient of the weighting function is determined using the high-resolution image obtained in step S12 and the low-resolution image obtained in step S13. Specifically, alignment is performed between the high-resolution image and the low-resolution image capturing the same region. Then, for the same region of the calibration sample D, the pixel value $P_i$ is determined from the high-resolution image, and the pixel value $P_{xjyk}$ is determined from the low-resolution image. Next, the pixel value $P_i$ and the pixel value $P_{xjyk}$ are substituted into the prototype of the interpolation function specified in step S11. The optimal value of each coefficient of the weighting function is determined by statistical technique such as multiple regression analysis. The set of values of the coefficients thus determined is stored in the storage section 20. Thus, an interpolation function having the optimized value of the coefficient is generated.

The set of values of the coefficients may be determined for each kind of the calibration sample D and stored in the storage section 20. For instance, the set of values of the coefficients may be determined for each of the cases where the calibration sample D is a lithography mask, where the calibration sample D is a nanoimprint template, and where the calibration sample D is a semiconductor wafer with an integrated circuit formed thereon. Then, the set of values of the coefficients may be stored in the storage section 20. Furthermore, also for the same calibration sample D, the set of values of the coefficients may be determined for each kind of the pattern formed thereon, and stored in the storage section 20. For instance, the calibration sample D is a semiconductor wafer with an integrated circuit formed thereon. Various regions may be formed in the calibration sample D. A region may include a line-and-space pattern extending in the horizontal direction. Another region may include a line-and-space pattern extending in the vertical direction. Another region may include a line-and-space pattern extending in an oblique direction. Another region may include a large number of dot patterns arranged in a matrix. Another region may include a random pattern. In this case, the value of the coefficient may be different among the regions. Furthermore, the set of values of the coefficients may be determined for each capture condition of the electron microscope 10 and stored in the storage section 20.

Next, the operation of the inspection device according to the embodiment, i.e., an inspection method according to the embodiment, is described.

Figure 6:
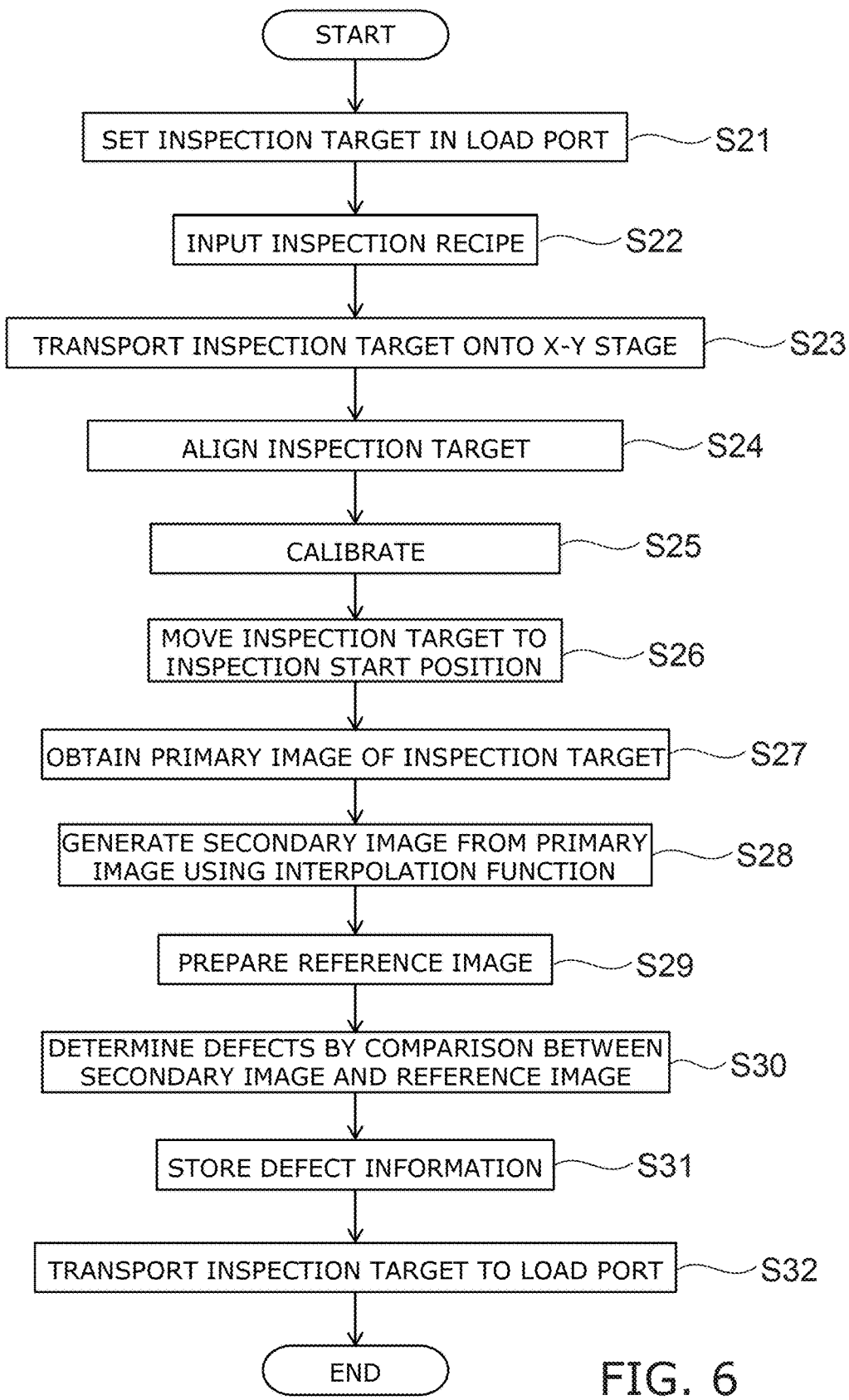
FIG. 6 is a flow chart showing the inspection method according to the first embodiment.

FIG. 6 is a flow chart showing the inspection method according to the embodiment.

First, as shown in FIG. 2 and step S21 of FIG. 6, an inspection target S is set in the load port 112 of the measurement device 1.

Next, as shown in step S22, an inspection recipe is inputted to the controller 183 of the measurement device 1. The inspection recipe includes e.g. alignment coordinate information including the angle and orthogonality of the inspection target S measured by the alignment optical microscope 113, inspection condition determination pattern information including the luminance range and calibration information such as the luminance unevenness of the detection section 150, inspection region, and inspection mode.

Next, as shown in step S23, the inspection target S is transported onto the X-Y stage 120. The vacuum pump 111 is started to decompress the reduced-pressure chamber 110. Thus, the electron microscope 10 is started.

Next, as shown in step S24, the stage control section 184 drives the X-Y stage 120 to transport the inspection target S to the alignment coordinates inputted in step S22. Then, alignment is performed in the X-direction and the Y-direction by the optical microscope 113. After performing alignment by the optical microscope 113, more accurate alignment may be performed using the electron image or other images.

Next, as shown in step S25, the stage control section 184 drives the X-Y stage 120 based on the inspection condition determination pattern information to move the inspection target S to a position enabling observation by the electron microscope 10. Then, electron beam irradiation is performed. Thus, calibration such as the brightness adjustment of the image and the adjustment of the sensor gain is performed based on the image obtained in the detection section 150.

Next, as shown in step S26, the X-Y stage 120 is driven based on the inspection region specified in step S22 to move the inspection target S to the inspection start position.

Next, as shown in step S27, while the stage control section 184 operates the X-Y stage 120, an electron beam is emitted from the electron beam source 130. Thus, the inspection target S is irradiated with the electron beam through the electron beam optical system 140. Accordingly, the inspection region of the inspection target S is scanned by the electron beam. Then, the detection section 150 detects electrons emitted from the inspection target S and obtains an electron image. At this time, the pixel size of the electron image is made equal to the pixel size of the low-resolution image IML. An integral image may be generated by repetitively scanning the same region and integrating the results. The image thus obtained is referred to as primary image IM1. The detection section 150 outputs the primary image IM1 to the image processing section 170.

Next, as shown in step S28, the image processing section 170 reads the image processing program from the storage section 20 and executes the image processing program. Thus, the pixel value is interpolated between the pixels of the primary image IM1 to generate a secondary image IM2. The pixel size of the secondary image IM2 is made smaller than the pixel size of the primary image IM1 and equal to the pixel size of the high-resolution image IMH. This program incorporates the interpolation function determined by the procedure shown in FIG. 3. The interpolation function includes the substituted set of values of the coefficients determined from the low-resolution image IML and the high-resolution image IMH by multiple regression analysis. When generating the secondary image IM2, in addition to the pixel value between the pixels of the primary image IM1, the pixel value of the pixel originally included in the primary image may be corrected using the interpolation function. This can fit the values of all the pixels to an approximate curve. Thus, a smoother secondary image can be generated.

In the embodiment, the image processing program stored in the storage section 20 can be described as follows. The image processing program is a program causing the image processing section 170 configured from a computer to execute the following procedure. A low-resolution image IML and a high-resolution image IMH are obtained from the calibration sample D. The high-resolution image IMH has smaller pixel size than the low-resolution image IML. A function is generated based on the low-resolution image IML and the high-resolution image IMH. A primary image IM1 is obtained from the inspection target S. The aforementioned function is used to generate a secondary image IM2 from the primary image IM1. The secondary image IM2 has smaller pixel size than the primary image IM1. This function is an interpolation function for interpolating the pixel value at a position between the pixels based on the pixel values of the pixels of the low-resolution image IML. Thus, the interpolation function generates a high-resolution image IMH. The interpolation function includes coefficients. The value of the coefficient is determined based on the pixel value of the low-resolution image IML and the pixel value of the high-resolution image IMH.

Next, as shown in step S29, the reference image generation section 181 prepares a reference image. The pixel size of the reference image is equal to the pixel size of the secondary image. When the inspection mode is the "Cell to cell" mode or "Die to die" mode, the reference image generation section 181 reads the image of the inspection target S captured by the electron microscope 10 and stored in the storage section 20. Then, the reference image generation section 181 outputs the image as a reference image to the image comparison section 182. On the other hand, when the inspection mode is the "Die to database" mode, the reference image generation section 181 reads the design data of the inspection target S stored in the storage section 20 and generates an artificial image based on this design data. The reference image generation section 181 outputs the artificial image as a reference image to the image comparison section 182.

Next, as shown in step S30, the image comparison section 182 generates a difference image between the secondary image IM2 and the reference image. When this difference image includes a region having a larger difference signal than a prespecified threshold, the image comparison section 182 determines that this region includes a defect. Furthermore, the image comparison section 182 identifies the coordinates of this defect from the information of the X-Y stage 120 inputted from the stage control section 184. The controller 183 temporarily stores defect information including the coordinates of the defect and the image.

Next, as shown in step S31, after the inspection of the inspection region is completed, the controller 183 transfers the defect information to the storage section 20. The storage section 20 stores this defect information.

Next, as shown in step S32, the stage control section 184 controls the X-Y stage 120 to transport the inspection target S to the unload position. Then, the inspection target S is transported to the load port 112 and retrieved. Thus, the inspection is completed.

Next, the effect of the embodiment is described.

According to the embodiment, when capturing the inspection target S, a primary image having large pixel size and low resolution is obtained. This provides high efficiency of inspection. After obtaining the primary image, a secondary image having smaller pixel size is generated using the interpolation function. Then, the presence or absence of defects is determined by comparison between the secondary image and the reference image. Thus, even if the primary image is coarse, the secondary image is finer. This increases the SN ratio of the defect signal to the ambient noise and improves the sensitivity of inspection. Thus, according to the embodiment, inspection with high sensitivity can be performed with high throughput.

In the embodiment, a low-resolution image and a high-resolution image are obtained using a calibration sample D of the same kind as the inspection target S. These images are used to determine the coefficient of the interpolation function. This provides high fitness of the interpolation function to the inspection target S. Thus, a secondary image with higher accuracy can be generated. This enables inspection with higher sensitivity. As a result, the yield and productivity of the inspection target S are improved.

In particular, the inspection target S itself may be used as a calibration sample D. This can further improve the fitness of the interpolation function to the inspection target S. In this case, the inspection target S can be left mounted in the electron microscope 10 to perform continuously the step of generating the interpolation function and the step of inspecting the inspection target S. More specifically, steps S12-S14 shown in FIG. 3 are performed between step S26 and step S27 shown in FIG. 6.

The inspection may be successively performed on a large number of inspection targets S. In this case, one or more inspection targets S at the beginning may be used as a calibration sample D. These inspection targets S may be subjected to both the generation of the interpolation function and the inspection. The remaining inspection targets S may be subjected to only the inspection. Thus, inspection with high accuracy can be efficiently performed.

Furthermore, the image processing program according to the embodiment can be installed on a computer associated with a conventional inspection device. Thus, the embodiment can be performed also by the conventional inspection device. This can improve throughput while maintaining the conventional inspection sensitivity. Alternatively, this can improve inspection sensitivity while maintaining the conventional throughput. Alternatively, the embodiment can be applied to a low-performance inspection device and improve the resolution of the image. Such an inspection device cannot capture an image with high resolution, and cannot perform inspection satisfying a prescribed standard. Thus, the low-performance inspection device can also perform the above inspection satisfying the prescribed standard. This can reduce the cost of the inspection device. As a result, the manufacturing cost of the inspection target S can be reduced.

In the example of the embodiment described above, the electron beam source of the point irradiation type is used as an inspection light source. However, the embodiment is not limited thereto, but may use an electron beam source of the multipoint irradiation type or the surface irradiation type. Alternatively, the embodiment may use a light source of visible light or ultraviolet radiation of the single or multiple point irradiation type or the surface irradiation type.

Second Embodiment

Next, a second embodiment is described.

The hardware configuration of the inspection device according to the embodiment is similar to that of the inspection device 1 shown in FIG. 1. However, the embodiment is different from the above first embodiment in the data and program stored in the storage section 20.

First, a method for generating preliminary data in the embodiment is described.

Figure 7A:
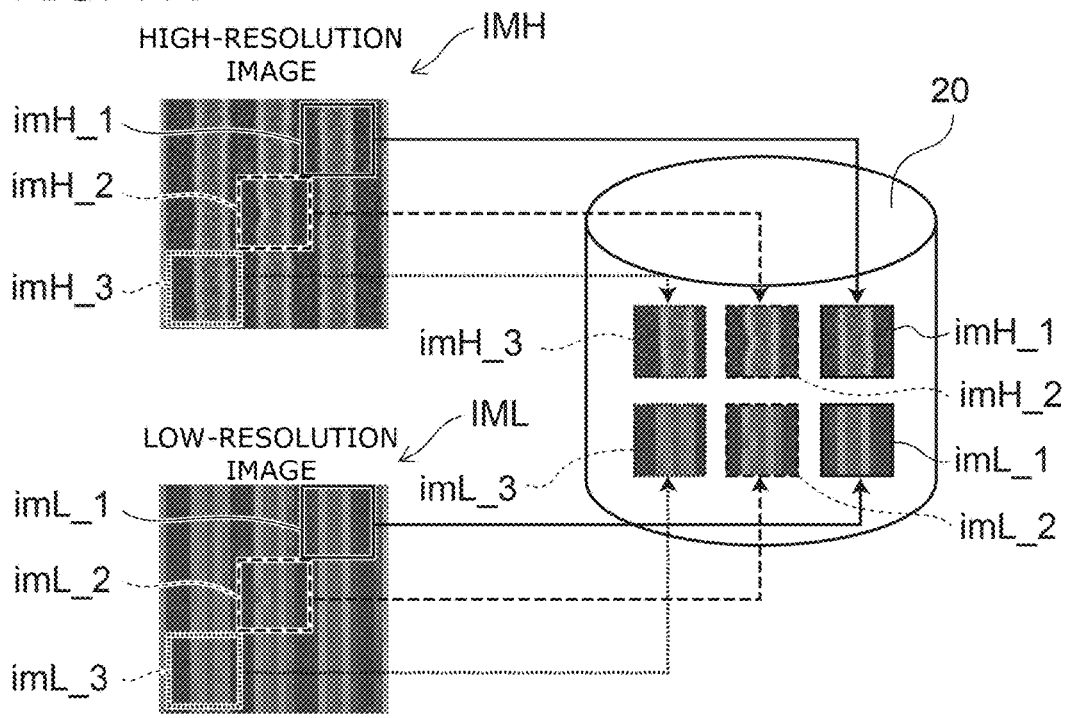
FIGS. 7A and 7B schematically show an inspection method according to a second embodiment.
Figure 7B:
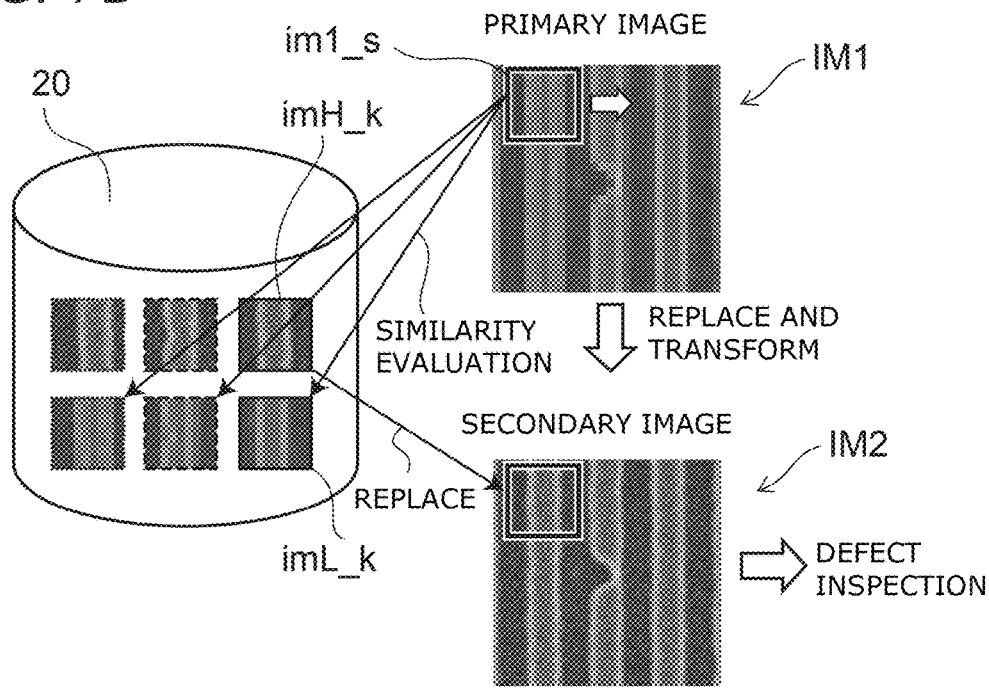

FIGS. 7A and 7B schematically show the inspection method according to the embodiment.

Figure 8:
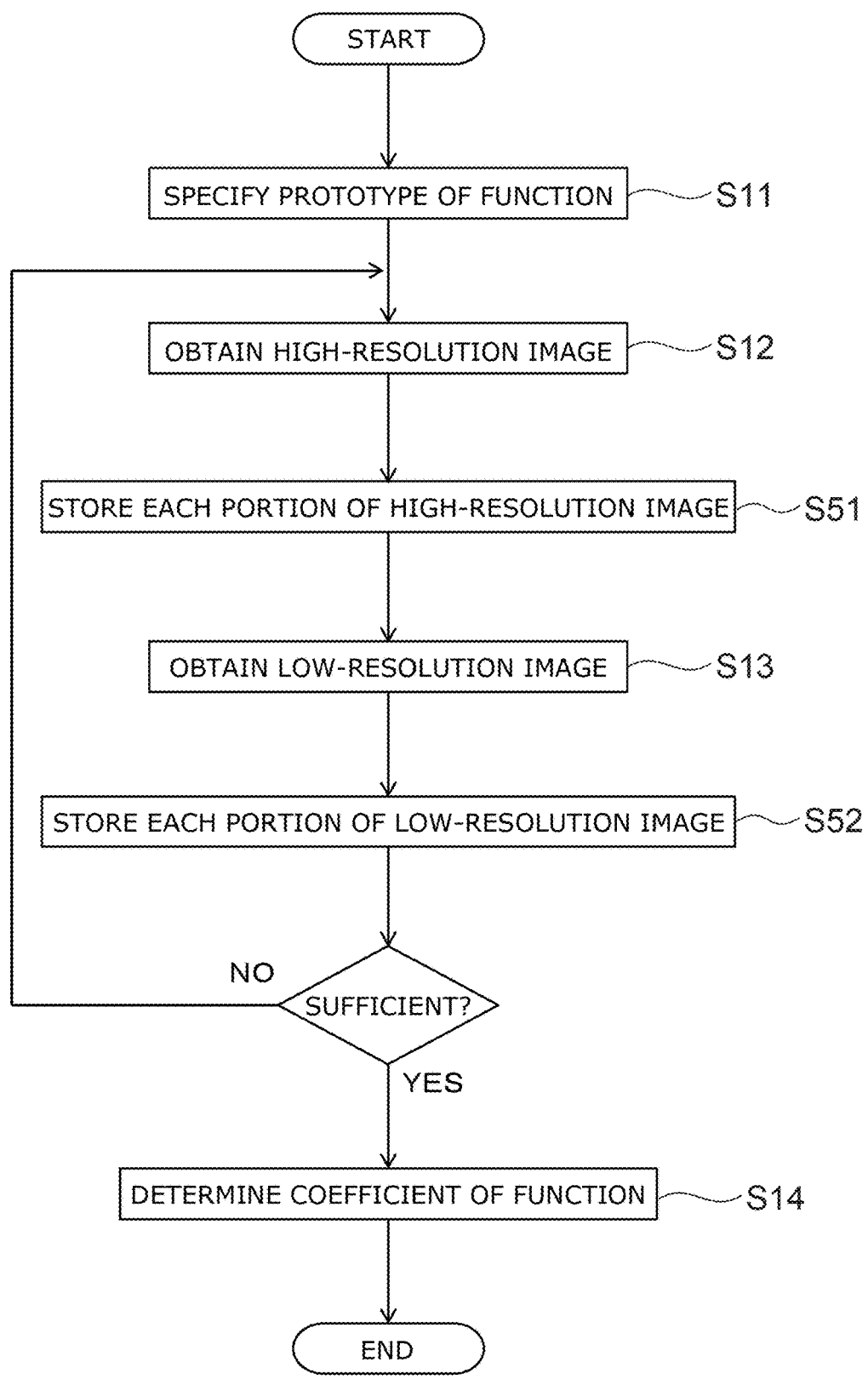
FIG. 8 is a flow chart showing a method for generating preliminary data in the second embodiment.

FIG. 8 is a flow chart showing the method for generating preliminary data in the embodiment.

First, as shown in step S11 of FIG. 8, a prototype of the function is specified by a method similar to that of the above first embodiment.

Next, as shown in step S12 of FIG. 8 and FIG. 2, the calibration sample D is captured by the electron microscope 10 to obtain a high-resolution image IMH.

Next, as shown in step S51 of FIG. 8 and FIG. 7A, the high-resolution image IMH is divided into a plurality of portions imH_1-imH_$n$ ($n$ being an integer of 2 or more) of the same number of pixels. The image of each portion is stored in the storage section 20.

Next, as shown in step S13 of FIG. 8, the calibration sample D is captured by the electron microscope 10 to obtain a low-resolution image IML. The high-resolution image IMH and the low-resolution image IML are obtained by capturing the same portion of the calibration sample D with different magnifications.

Next, as shown in step S52 of FIG. 8 and FIG. 7A, the low-resolution image IML is divided into a plurality of portions imL_1-imL_$n$ of the same number of pixels. The image of each portion is stored in the storage section 20. At this time, the portion imH_$k$ ($k$ being an integer of 1-n) of the high-resolution image IMH stored in step S51 and the portion imL_$k$ of the low-resolution image IML stored in step S52 are images of the same small portion of the calibration sample D. These portions are stored in combination. In other words, part of the high-resolution image IMH and part of the low-resolution image IML corresponding to each small portion of the calibration sample D are stored as a pair. The subsequent part of the generation method is similar to that of the above first embodiment.

Next, an inspection method according to the embodiment is described.

Figure 9:
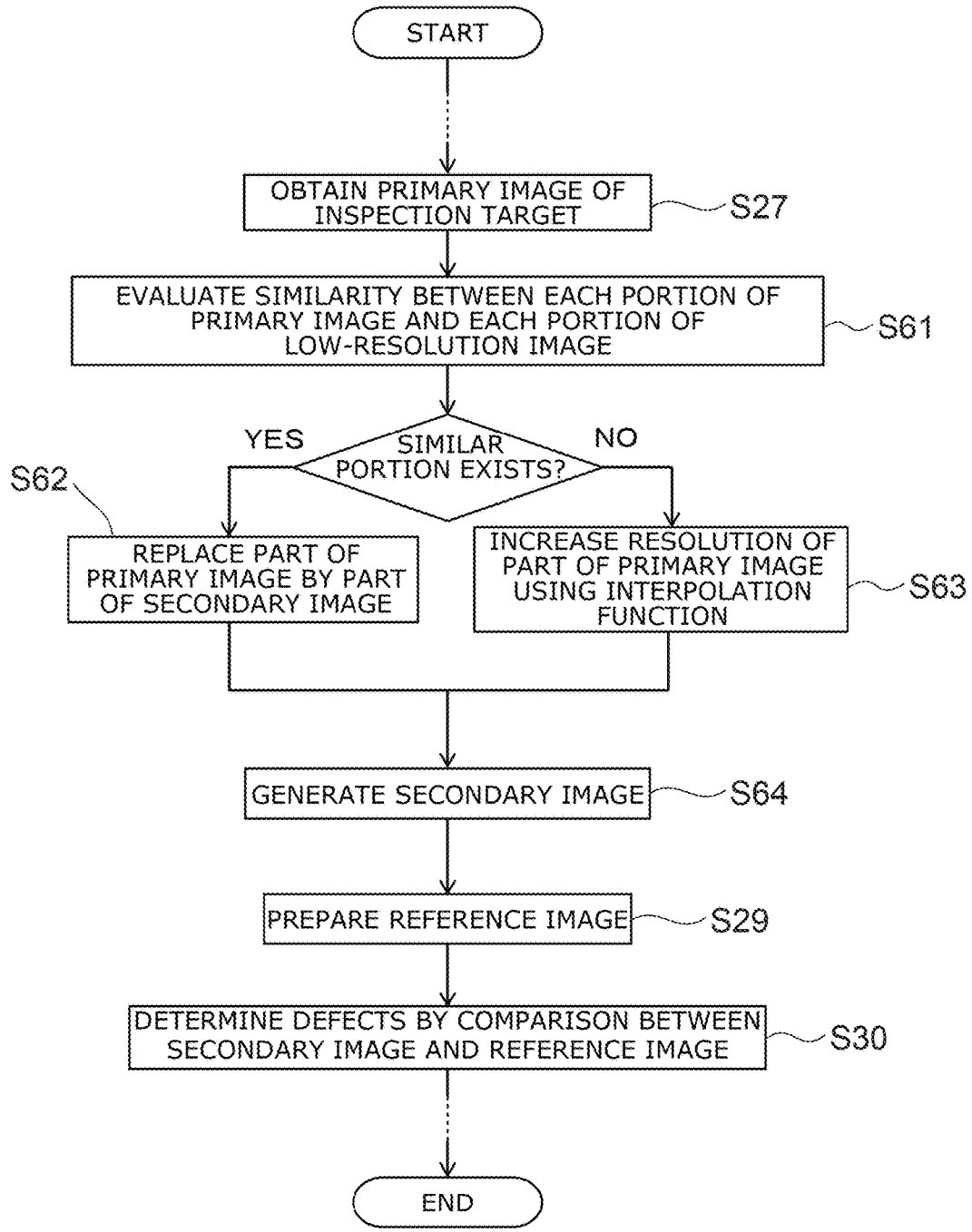
FIG. 9 is a flow chart showing the inspection method according to the second embodiment.

FIG. 9 is a flow chart showing the inspection method according to the embodiment.

In FIG. 9, steps S21-S26 shown in FIG. 6 are omitted between "START" and step "S27". Steps S31-S32 shown in FIG. 6 are omitted between step "S30" and "END".

First, steps S21-S27 of FIG. 6 are performed by a method similar to that of the above first embodiment to obtain a primary image IM1.

Next, as shown in step S61 of FIG. 9 and FIG. 7B, the image processing section 170 divides the primary image IM1 into a plurality of portions im1_1-im1_$n$. The number of pixels of each portion im1_$k$ of the primary image IM1 is made equal to the number of pixels of each portion imL_$k$ of the low-resolution image IML. Next, the image processing section 170 evaluates similarity between each portion im1_$k$ of the primary image IM1 and all the portions imL_1-imL_$n$ of the low-resolution image IML.

The similarity is defined as e.g. the sum of the inverse of the square of the difference between the pixel value of the portion im1_$k$ of the primary image IM1 and the pixel value of the portion imL_$k$ of the low-resolution image IML. More specifically, at a given point, the pixel value of the high-resolution image is denoted by $P_H$, and the pixel value of the low-resolution image is denoted by $P_L$. The threshold for determination is denoted by $\beta$. The portion satisfying the following formula (8) is determined to have high similarity. The portion not satisfying the following formula (8) is determined to have low similarity.

$$\Sigma(P_H - P_L)^{-2} \geq \beta \qquad \text{[Math 8]}$$

Of the plurality of portions im1_1-im1_$n$ of the primary image, the portion im1_$s$ determined to have high similarity to one portion imL_$k$ of the low-resolution image IML is determined to include no defect. As shown in step S62, the portion im1_$s$ is replaced by the corresponding portion imH_$k$ of the high-resolution image.

On the other hand, of the plurality of portions im1_1-im1_$n$ of the primary image, the portion im1_$t$ not having high similarity to any portion imL_$k$ of the low-resolution image IML is determined to possibly include a defect. As shown in step S63, this portion im1_$s$ is transformed by the interpolation function to increase the resolution. The method for this transformation is similar to that of the above first embodiment.

Thus, as shown in step S64, a secondary image IM2 is generated. At least a portion of the secondary image IM2 is a portion in which part of the primary image is replaced by part of the high-resolution image. The remaining portion is a portion in which the primary image is transformed by the interpolation function.

The subsequent process is similar to that of the above first embodiment. That is, as shown in step S29, a reference image is prepared. As shown in step S30, the presence or absence of defects is determined by comparison between the secondary image and the reference image.

Next, the effect of the embodiment is described.

According to the embodiment, in the primary image, the portion having high similarity to the low-resolution image is replaced by part of the high-resolution image. The portion having low similarity to the low-resolution image is subjected to resolution enhancement processing using the interpolation function. Thus, the total amount of calculation can be reduced compared with the case of performing the resolution enhancement processing on the entirety of the primary image. This further improves the throughput of inspection.

The configuration, method, and effect of the embodiment other than the foregoing are similar to those of the above first embodiment.

Third Embodiment

Next, a third embodiment is described.

The embodiment is different from the above second embodiment as follows. The storage section 20 stores pairs of the low-resolution image and the high-resolution image for various patterns. At the time of inspection, a secondary image is generated only by replacement without performing transformation using a function.

An inspection method according to the embodiment is described.

Figure 10A:
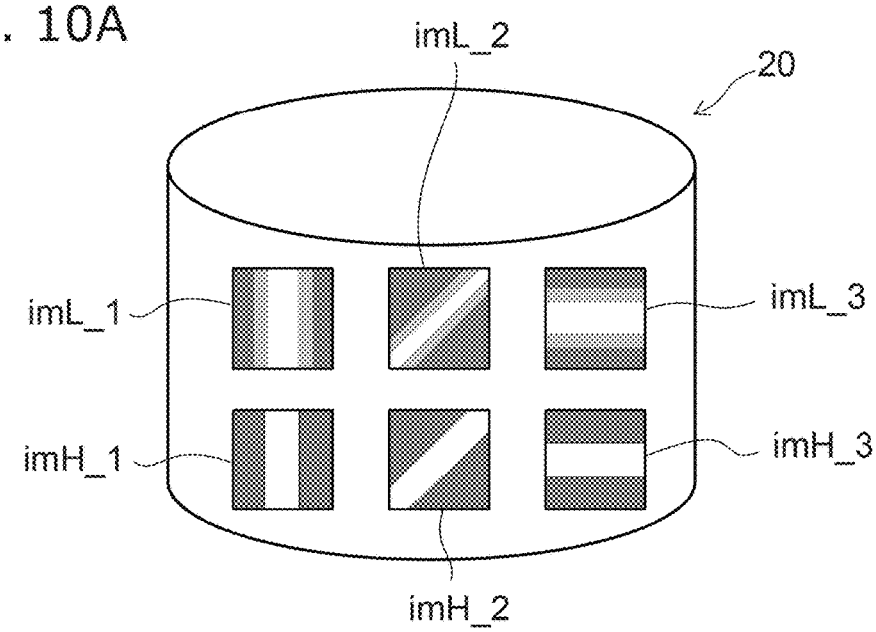
FIGS. 10A and 10B schematically show an inspection method according to a third embodiment.
Figure 10B:
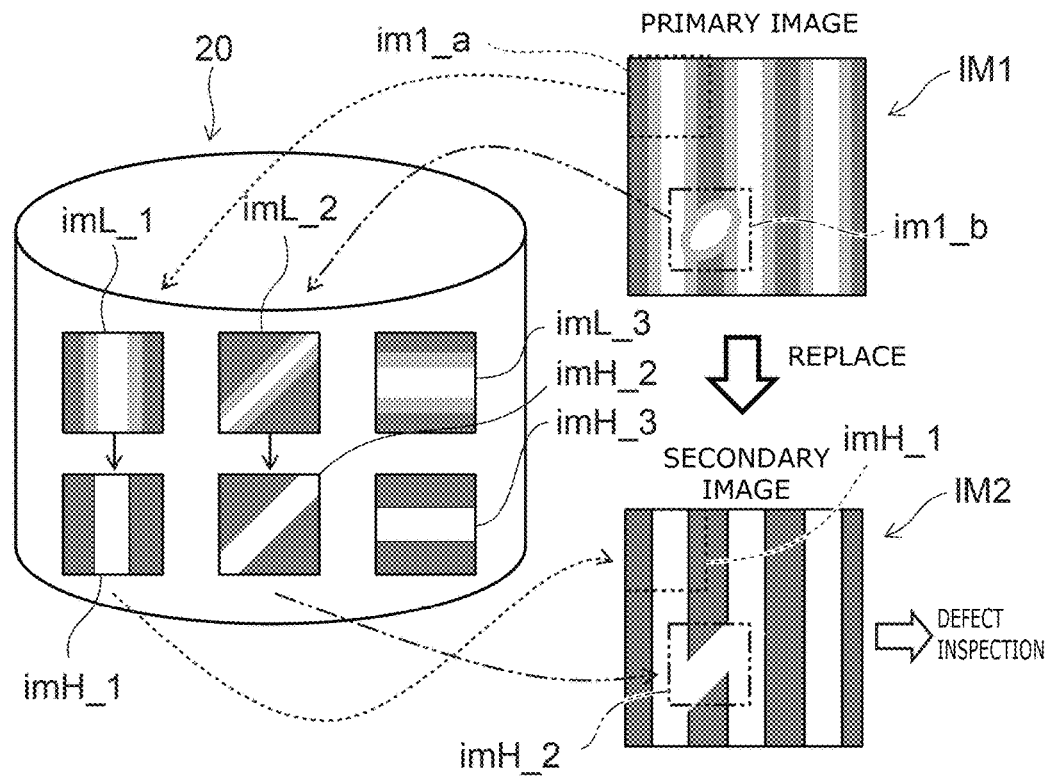

FIGS. 10A and 10B schematically show the inspection method according to the embodiment.

Figure 11:
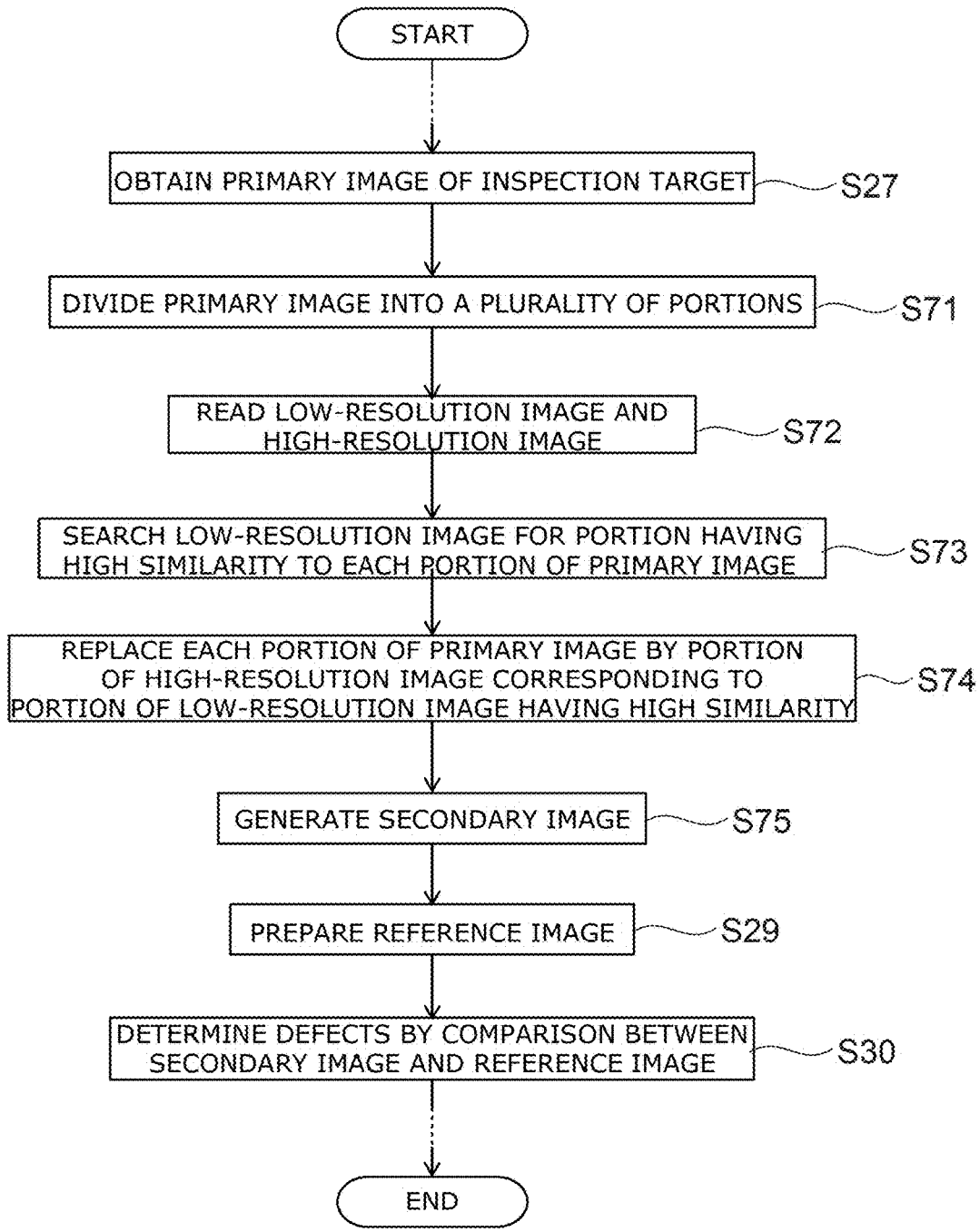
FIG. 11 is a flow chart showing the inspection method according to the third embodiment.

FIG. 11 is a flow chart showing the inspection method according to the embodiment.

Also in FIG. 11, as in FIG. 9, steps S21-S26 shown in FIG. 6 are omitted between "START" and step "S27". Steps S31-S32 shown in FIG. 6 are omitted between step "S30" and "END".

In the embodiment, as shown in FIG. 10A, in advance to inspection, the portions imL_1-im1_$n$ of the low-resolution image of various patterns and the corresponding portions imH_1-imH_$n$ of the high-resolution image are stored in the storage section 20. The portion imH_$k$ of the low-resolution image and the portion imH_$k$ of the high-resolution image are images obtained by capturing the same portion of the calibration sample D, and are stored in combination. For instance, the portion imL_1 and the portion imH_1 are obtained by capturing a wiring extending in the vertical direction. The portion imL_2 and the portion imH_2 are obtained by capturing a wiring extending in an oblique direction. The portion imL_3 and the portion imH_3 are obtained by capturing a wiring extending in the horizontal direction.

First, steps S21-S27 of FIG. 6 are performed by a method similar to that of the above first embodiment to obtain a primary image IM1.

Next, as shown in step S71 of FIG. 11 and FIG. 10B, the image processing section 170 divides the primary image IM1 into a plurality of portions im1_1-im1_$n$. The number of pixels of each portion imL_$k$ of the primary image IM1 is made equal to the number of pixels of each portion imL_$k$ of the low-resolution image IML.

Next, as shown in step S72, the image processing section 170 reads the portions imL_1-imL_$n$ of the low-resolution image and the portions imH_1-imH_$n$ of the high-resolution image from the storage section 20.

Next, as shown in step S73, the image processing section 170 evaluates similarity between each portion imL_$k$ of the primary image IM1 and all the portions imL_1-imL_$n$ of the low-resolution image IML. The image processing section 170 searches the low-resolution image IML for a portion having high similarity to each portion of the primary image IM1. The evaluation of the similarity is performed by a method similar to that of the above second embodiment.

For instance, the portion im1_$a$ of the primary image IM1 is obtained by capturing a wiring portion extending in the vertical direction and including no defect. The portion im1_$a$ has high similarity to the portion imL_1 of the low-resolution image IML representing a vertical wiring. On the other hand, the portion im1_$b$ of the primary image IM1 is obtained by capturing a portion including a short-circuit defect between the wirings extending in the vertical direction. The portion im1_$b$ has high similarity to the portion imL_2 of the low-resolution image IML representing a wiring extending in the oblique direction. Thus, for all the portions of the primary image IM1, the low-resolution image IML is searched for a portion having high similarity.

Next, as shown in step S74, each particular portion of the primary image is replaced by the portion of the high-resolution image corresponding to the portion of the low-resolution image having high similarity to the particular portion. For instance, the portion im1_$a$ of the primary image IM1 has high similarity to the portion imL_1 of the low-resolution image IML. The portion imH_1 of the high-resolution image IMH corresponds to the portion imL_1. Thus, the portion im1_$a$ is replaced by the portion imH_1. On the other hand, the portion im1_$b$ of the primary image IM1 has high similarity to the portion imL_2 of the low-resolution image IML. The portion imH_2 of the high-resolution image IMH corresponds to the portion imL_2. Thus, the portion im1_b is replaced by the portion imH_2.

Thus, all the portions of the primary image IM1 are replaced by the portions of the high-resolution image IMH. Accordingly, as shown in step S75, a secondary image IM2 is generated.

The subsequent process is similar to that of the above first embodiment. That is, as shown in step S29, a reference image is prepared. As shown in step S30, the presence or absence of defects is determined by comparison between the secondary image and the reference image.

In the embodiment, the program executed by the image processing section 170 can be described as follows. The image processing program according to the embodiment is a program causing the image processing section 170 configured from a computer to execute:

a procedure (step S71) for dividing the primary image IM1 of the inspection target S into a plurality of portions, a procedure (step S72) for reading each portion of the low-resolution image IML and each portion of the high-resolution image IMH of the same calibration sample D, the high-resolution image IMH having smaller pixel size than the low-resolution image IML, a procedure (step S73) for searching the low-resolution image IML for a portion having high similarity to each portion of the primary image IM1 of the inspection target S, and a procedure (step S74) for replacing each particular portion of the primary image IM1 by the portion imH_k of the high-resolution image IMH corresponding to the portion imH_k of the low-resolution image IML having high similarity to the particular portion.

Next, the effect of the embodiment is described.

According to the embodiment, the primary image having large pixel size can be replaced by a secondary image having small pixel size without generating an interpolation function. Thus, in the defect inspection, the primary image having large pixel size is obtained by a microscope. This provides has high throughput. The inspection is performed using the secondary image having small pixel size. This provides high sensitivity.

The configuration, method, and effect of the embodiment other than the foregoing are similar to those of the above second embodiment.

The embodiments described above can realize an inspection device, an inspection method, and an image processing program providing compatibility between high sensitivity and high throughput.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An inspection device comprising:
    a microscope configured to obtain a primary image by capturing an inspection target;
    a storage device storing a function defining a relationship between a low-resolution image and a high-resolution image of a calibration sample, the high-resolution image having smaller pixel resolution than the low-resolution image; and
    a processor configured to generate a secondary image based on the primary image by using the function, the secondary image having smaller pixel resolution than the primary image and configured to inspect the inspection target using the secondary image,
    wherein the inspection target is used as the calibration sample.

2. The device according to claim 1, wherein the function is an interpolation function configured to generate the high-resolution image by using pixel values of pixels of the low-resolution image to interpolate a pixel value at a position between the pixels.

3. The device according to claim 1, wherein the function includes a coefficient with a value determined based on a pixel value of the low-resolution image and a pixel value of the high-resolution image.

4. The device according to claim 1, wherein the function includes a plurality of coefficients with values determined based on a pixel value of a plurality of the low-resolution images and a pixel value of a plurality of the high-resolution images.

5. The device according to claim 3, wherein the value of the coefficient is different depending on kind of the inspection target.

6. The device according to claim 3, wherein the value of the coefficient is different depending on kind of a pattern formed on the inspection target.

7. The device according to claim 1, wherein the microscope obtains the low-resolution image and the high-resolution image by capturing the calibration sample.

8. The device according to claim 1, wherein the storage device stores each portion of the low-resolution image and each portion of the high-resolution image in combination, and the processor determines similarity between each portion of the primary image and each portion of the low-resolution image, replaces a portion of a plurality of portions of the primary image having high similarity to any portion of the low-resolution image by a portion of the high-resolution image corresponding to the portion of the low-resolution image having high similarity, and transforms a portion of the plurality of portions of the primary image not having high similarity to any portion of the low-resolution image by using the function.

9. An inspection device comprising:
    a microscope configured to obtain a primary image by capturing an inspection target;
    a storage device storing in combination each portion of a low-resolution image and each portion of a high-resolution image capturing a same calibration sample, the high-resolution image having smaller pixel resolution than the low-resolution image;
    a processor configured to generate a secondary image having smaller pixel resolution than the primary image by searching the low-resolution image for a portion having high similarity to each portion of the primary image and replacing the each portion of the primary image by a portion of the high-resolution image corresponding to the portion of the low-resolution image having high similarity to the each portion and configured to inspect the inspection target using the secondary image.

10. The device according to claim 1, wherein the pixel resolution of the primary image is equal to the pixel resolution of the low-resolution image.

11. The device according to claim 1, wherein the pixel resolution of the secondary image is equal to the pixel resolution of the high-resolution image.

12. The device according to claim 1, wherein the inspection target and the calibration sample are semiconductor wafers with an integrated circuit formed thereon.

13. The device according to claim 1, wherein the inspection target and the calibration sample are lithography masks.

14. The device according to claim 1, wherein the inspection target and the calibration sample are nanoimprint templates.

15. The device according to claim 1, wherein the microscope includes:
- an electron beam source configured to emit an electron beam; and
- an image sensor configured to generate the primary image by detecting an electron beam obtained from the inspection target by irradiation of the inspection target with the electron beam emitted from the electron beam source.

16. An inspection method comprising:
- obtaining a primary image of an inspection target;
- generating a secondary image based on the primary image by using a function generated based on a low-resolution image and a high-resolution image of a calibration sample, the secondary image having smaller pixel resolution than the primary image, the high-resolution image having smaller pixel resolution than the low-resolution image; and
- inspecting the inspection target using the secondary image,
- wherein the inspection target is used as the calibration sample.

17. The method according to claim 16, wherein the function is generated by substituting a pixel value of the low-resolution image and a pixel value of the high-resolution image into a prototype of the function including a coefficient with an unknown value and determining the value of the coefficient.

* * * * *